United States Patent [19]
Doyle et al.

[11] Patent Number: 5,437,717
[45] Date of Patent: Aug. 1, 1995

[54] ASPHALT COMPOSITIONS WITH IMPROVED CROSS-LINKING AGENT

[75] Inventors: Michael P. Doyle, Phoenix, Ariz.; Jimmy L. Stevens, Rio Linda, Calif.

[73] Assignee: Vinzoyl Petroleum Co., Phoenix, Ariz.

[21] Appl. No.: 258,935

[22] Filed: Jun. 13, 1994

[51] Int. Cl.$^6$ .................... C09D 195/00; C09D 7/12; C08L 93/00; C08L 91/00
[52] U.S. Cl. .................... 106/220; 106/229; 106/284.4
[58] Field of Search .................... 106/220, 229, 284.4

[56] References Cited

U.S. PATENT DOCUMENTS

| | | | |
|---|---|---|---|
| 4,450,011 | 5/1984 | Schilling et al. | 106/284.4 |
| 4,806,166 | 2/1989 | Schilling et al. | 106/284.4 |
| 4,859,245 | 8/1989 | Schilling et al. | 106/284.4 |

Primary Examiner—David Brunsman
Attorney, Agent, or Firm—Vinson & Elkins

[57] ABSTRACT

An improved, substantially anhydrous, cross-linking agent is disclosed for use in asphalt compositions of the type used for roofing and paving materials. The cross-linking agent comprises a blend of tall oil, a strong base, n-methyl fatty acid taurate, and fatty amines and is substantially free of water.

13 Claims, No Drawings

ASPHALT COMPOSITIONS WITH IMPROVED CROSS-LINKING AGENT

FIELD OF THE INVENTION

This invention relates to asphalt compositions of the type utilized for roofing and paving materials, as well as to processes for their preparation, characterized by the use of an improved cross-linking agent produced by the anhydrous saponification of tall oil.

BACKGROUND OF THE INVENTION

Asphalt (or bitumen) compositions are in widespread use as asphalt-aggregate blends for road paving, in roofing shingles, in hot applied asphalt roofing systems, and similar applications. A problem with such compositions is their tendency to become brittle at low temperatures and to become soft at high temperatures. Various additives, polymers, etc., have been utilized for the purpose of improving the high and low temperature characteristics of asphalt compositions, as well as to improve their toughness and durability. Tall oil, produced primarily as a byproduct of certain paper manufacturing processes, is widely used for this purpose, both as a direct additive and in its various modified forms, including saponified tall oil. However, most prior art processes for tall oil saponification have utilized added water (usually as a component of a caustic solution used in the saponification process) with the result that the saponified tall oil product often has a high water content. Water is deleterious to high temperature asphalt blending processes, since the water flashes off, resulting in the swelling of the asphalt, production of large quantities of steam vapor containing entrained light end components, leaching of hydrocarbons from the asphalt, etc. The prior art therefore discloses various attempts to produce asphalt blends, or other tall oil containing compositions utilizing a minimum of added water. Another limitation of the prior art has been a limit on the amount of saponified tall oil capable of being kept in solution with asphalt. Prior art methods did not address tall oil-asphalt compatibility.

U.S. Pat. No. 5,221,703 entitled "Engineered Modified Asphalt Cement" relates to a modified bituminous material containing asphalt, tall oil, a polymer (such as styrene butidiene, natural latex, etc.) and a strong base (preferably sodium hydroxide or potassium hydroxide). A small amount of water is present in the composition, either as water in a solution of the strong base, or water in a latex added as the polymer in the composition.

U.S. Pat. No. 1,81.3,454 entitled "Saponification" discloses a process for saponifying organic esters, particularly the esters of fatty acids, such as vegetable and animal fats. The process comprises treating the organic ester with substantially anhydrous alkali in the presence of an inert organic diluent in which the alcoholic component of the ester is substantially insoluble, and simultaneously removing the alcoholic component in a concentrated form by partial pressure distillation of the diluent and the alcoholic component.

U.S. Pat. No. 2,268,122 entitled "Road Tars or the Like and the Methods of Making Them" also discloses a process for substantially anhydrous saponification of fatty oils using an organic diluent such as kerosene.

U.S. Pat. No. 2.753.363 entitled "Method of Making Soap" relates to the manufacture of soap, and more particularly to an improved method of making a soap of relatively low moisture content wherein the saponification is carried out in two stages. In the first stage, a fatty acid mixture, or a mixture of fatty acids and glycerides, is reacted with a quantity of dry alkali metal carbonate that is sufficient to saponify a substantial proportion of the free fatty acids present in the raw material but insufficient to saponify all of the fatty materials present. Thereafter, in a second stage, saponification of the fatty material is completed with a concentrated aqueous caustic alkali.

U.S. Pat. No. 4,129,520 entitled "Soap Making" discloses a process for saponifying organic acid esters in fats from animal or vegetable sources in which process the organic acid esters are saponified with alkali metal hydroxide in a liquid reaction medium comprising a substantially water-free alkyl nitrile. The preferred anhydrous reaction media are acetonitrile and proprionitrile. The stated advantage of the anhydrous preparation method is that the solvent removal is less energy intensive than in aqueous processes. The preferred products of the process are soaps and detergents.

U.S. Pat. No. 4,874,432 entitled "Multigrade Asphalt Cement Product and Process" relates to a process for producing a multi-grade asphalt cement product. The process involves saponifying in liquefied asphalt, substantially free of water, at least one fatty acid and at least one resin acid with an alkali metal base, or by adding the already saponified acid to the liquefied asphalt. The resulting gelled asphalt cement is utilized in conventional processes for road paving, roofing, and specialty applications. The preferred organic acid component for the process is tall oil and the preferred alkali metal base is anhydrous sodium hydroxide.

A secondary feature of the asphalt compositions of the present invention is their ability to incorporate substantial amounts of crumb rubber from used automobile tires. A significant ecological problem is presented in the U.S. by the accumulation of used automobile tire carcasses which are very difficult to dispose of or to recycle into other uses. Various proposals have been made for incorporating crumb rubber from shredded used tires into asphalt paving compositions. However, the vulcanizing process used in manufacturing the tires, as well as the presence of various fillers, plasticizers, elastomers and other ingredients in the tires, make it very difficult to successfully incorporate crumb rubber from used tires into paving compositions. When blended into asphalt concrete compositions, the vulcanized rubber particles do not easily bond to the asphalt cement, and tend to separate from the composition. PCT International Publication WO93/17076 entitled "Asphalt Composition and Process for Obtaining Same," and the prior art patents and publications discussed therein, disclose a variety of prior art attempts to successfully incorporate ground rubber from automobile fires into asphalt paving or roofing compositions. Such efforts have not been commercially successful.

SUMMARY OF THE INVENTION

It is, accordingly, the primary object of the present invention to provide an improved cross-linking agent for asphalt compositions, characterized by the anhydrous saponification of tall oil. This improved cross-linking agent contains a tall oil-asphalt compatabilizer. This compatabilizer allows high percentages of saponified tall oil to be added to asphalt without separation occurring. Prior art methods would not allow these high percentages. This allows the asphalt to be modified to achieve extreme properties.

Another object is to provide asphalt compositions utilizing such cross-linking agent which demonstrate improved high and low temperature performance characteristics, as well as improved adhesion and overall wear characteristics.

A further object is to provide such improved asphalt compositions which incorporate substantial amounts of crumb rubber from used automobile tires and in which such crumb robber is successfully maintained in suspension.

A further object is to provide such asphalt compositions which meet SHRP ("Strategic Highway Research Program") specifications, without the use of expensive, high polymer content in the compositions, as well as to provide asphalt compositions incorporating crumb rubber which meet SHRP specifications.

A further object is to provide asphalt compositions which meet the requirements for use in roofing applications without requiring that the asphalt be air blown.

As discussed more fully in the detailed disclosure below, these objects and advantages of the invention are accomplished by producing an improved cross-linking agent for asphalt compositions characterized by the anhydrous saponification of tall oil utilizing a dry caustic dissolved in an organic solvent. The caustic fully dissolves in the solvent and does not require shearing as in other inventions. The resulting anhydrous saponified tall oil product demonstrates superior additive effect in converting asphalt compositions to non-Newtonian flow characteristics, as compared to prior art aqueous saponified tall oils, thereby improving their high temperature and low temperature performance characteristics. Asphalt compositions incorporating the anhydrous saponified tall oil cross-inking agent also demonstrate superior performance in their ability to adhere to aggregate and to retain in suspension crumb rubber from pulverized automobile tires. No prior art asphalt additive has demonstrated a satisfactory ability to adhere to and to retain such crumb rubber components in suspension in asphalt paving mixtures.

DETAILED DISCLSOURE

The improved asphalt cross-linking agent of the invention is prepared by saponifying tall oil in a strong anhydrous base. Tall oil is a natural mixture of rosin acids and fatty acids, together with unsaponifiable materials, which is obtained in commercial quantities by acidifying the black liquor skimmings of the sulfate process of wood pulp manufacture or kraft paper manufacture, using resinous woods such as pine. The composition of tall oil varies somewhat depending upon such factors as the species of the wood which was pulped. Tall oil made from trees in northern U.S. states, such as Michigan, Wis., and Minnesota, tends to have a higher rosin acid content. Crude tall oil acids generally will contain 18% to 60% fatty acids, 28% to 66% rosin acids and 3% to 24% unsaponified materials.

For the purpose of this invention, crude tall oil acids may be used; however, it is preferable to use distilled tall oil. The distillation may be carried out by introducing crude tall oil into a fractionation unit to separate the volatile fraction of crude tall oil from the nonvolatile or pitch. Except for some separation of palmitic and more volatile acids in the first fraction, tall oil distillates have nearly the same composition as the crude tall oil. A typical tall oil distillate may contain from 30% to 66% rosin acids, from 37% to 52% tall oil acids and from 3% to 12% unsaponifiable materials. Various ratios of fatty acid to rosin acid may be used.

The fatty acid fraction contains saturated and unsaturated fatty acids and the rosin acid fraction contains a number of different rosin acids with the greatest portion concentrated in the following typical analysis which is intended to be suggestive and not limited.

|  | Percent |
|---|---|
| Fatty Acid Fraction | |
| Saturated acids | 7.8 |
| Oleic acid | 39.2 |
| Linoleic acid | 26.1 |
| Conjugated dienoic acids | 15.4 |
| Other fatty acids | 11.5 |
| Rosin Acid Fraction | |
| Dihydropimaric | 2.0 |
| Primaric type | 13.6 |
| Dihydroabietic | 3.8 |
| Palustric | 9.2 |
| Abietic | 43.8 |
| Dehydroabietic | 21.4 |
| Neoabietic | 6.2 |
|  | 100.0 |

The unsaponifiable materials consist mainly of hydrocarbons, high molecular weight alcohols, primarily sterols, and small quantities of degradation products of lignin compounds. Small quantities of water, on the order of 2% to 3%, also commonly are present in crude tall oil. For purposes of the present invention, it is preferred that tall oil used in preparing the cross-linking agent first be heated to a temperature sufficiently high to assure that all water, if any, contained in the tall oil has been removed.

As used herein, "tall oil" means tall oil, tall oil pitch, tall oil derivatives, or mixtures of any two or more of these, unless otherwise specifically stated.

The anhydrous strong base used to saponify the tall oil is prepared by solubilizing anhydrous sodium hydroxide in a non-aqueous solvent. The preferred solvent is an n-methyl fatty acid taurate (sold under the trade name "Polyfac TT-3" by Westvaco Chemicals, Charleston Heights, South Carolina) to form a solution containing sodium salts of taurate. An additional proprietary product, comprising a blend of various fatty amines (sold under the trademark "Catamine 101" by Exxon Chemical Americas, Miton, Wisconsin) preferably also is added, since it improves subsequent saponification of the tall oil and compatabilizes the tall oil with the asphalt.

When the resulting strong base is blended with crude tall oil, the fatty rosin acids in the crude tall oil are saponified to form a soft soap which has a high affinity for the polar compounds in asphalt and acts as a binding agent in asphalt blends. As a result, the asphalt blends are converted from Newtonjan to non-Newtonian flow characteristics.

A preferred composition for the cross-linking agent is: crude tall oil 71 weight percent; anhydrous sodium hydroxide 13 weight percent; n-methyl fatty acid taurate (Polyfac TT-3), 8 weight percent; fatty amines (Catamine 101), 8 weight percent. However, the exact composition may vary widely within the general range of tall oil being 50 weight percent to 80 weight percent; anhydrous sodium hydroxide 10 weight percent to 25 weight percent; n-methyl fatty acid tautate 5 weight percent to 25 weight percent; and fatty amines 1 weight percent to 20 weight percent. If desired, in lieu of the Catamine 101, any other polyamine or fatty amine mixture may be substituted. Similarly, Polyfac TT-3 may be replaced by other anhydrous organic solvents or surfactants suitable for solubilizing metal salts, such as, for example, Witco AE-7 (quatanary ammonium chloride).

In the preferred order of addition and blending of the components for the cross-linking agent, anhydrous sodium hydroxide beads are added to the Polyfac TT-3 with continuous stirring. The addition of the caustic raises the temperature to approximately 165° F. Stirring continues until the caustic is solubilized. The Catamine 101 is then added while a small amount of heat is applied to maintain 160° F. to 180° F. The resulting mixture is then blended with water-free crude tall oil (at about 220° F.) with stirring and continued heating (to about 240° F.) until the exothermic saponification reaction is completed (about 10 minutes). The resulting saponified tall oil cross-linking agent is then blended immediately with hot asphalt or bitumen, which may contain other ingredients (aggregate, crumb rubber, other additives, etc.) to produce the final product.

The amount of cross-linking agent blended with the asphalt will vary widely, depending upon the intended application. However, generally from about 1 weight percent to about 6 weight percent of cross-linking agent will be used, based upon the combined weight of the asphalt/cross-linking agent blend.

When crumb rubber/asphalt blends are created, the asphalt is first heated to between 375° F. to 490° F., but more preferably, about 400° F. The crumb rubber is added at between 5 weight percent and 25 weight percent based on asphalt weight, depending on the desired properties. A high shear mill is used to reduce the size of the rubber which may be from 10 mesh to 80 mesh with 30 mesh being preferred. The crumb rubber and asphalt are sheared 1 to 3 hours with 2 hours being preferred. The asphalt/rubber composition temperature is lowered to 375° F. and the cross-linking agent added at between 1 weight percent and 6 weight percent, with 3.5 weight percent preferred, based on total composition weight. Aromatic oils may also be added to maintain the original asphalt internal chemistry and aid in digesting the crumb rubber.

EXPERIMENTAL

To demonstrate the improvements of the present invention, a series of asphalt batches were prepared and tested, with and without the anhydrous saponified tall oil cross-linking agent. The cross-linking agent used in the experiments was prepared in accordance with the following formula:

| Weight Percent | Component |
| --- | --- |
| 71 | Crude Tall Oils |
| 12.8 | Anhydrous Sodium Hydroxide |
| 8.1 | Polyfac TT-3 |
| 8.1 | Catamine 101 |

The method of preparation of the cross-linking agent is as procedure disclosed above.

The compositions of the test batches, and their methods of preparation were as follows, test results are listed in Tables 1 and 2:

1. AC-5. This is a standard asphalt meeting AASHTO M226-80 Table II for AC-5.
2. AC-5+3.3 Weight Percent CLA, Based on Asphalt Weight. The asphalt in No. 1 above is heated to 375° F. While maintaining 375° F., 3.3 weight percent CLA is added and stirred in. Once all the CLA is solubilized in asphalt, stir for 10 to 15 minutes to cross link the asphalt. Then test.
3. AC-5+10 Weight Percent Tire Rubber ("TR")+2 Weight Percent Oil, Based on Asphalt Weight. Heat AC-5 plus oil to 400° F. and add TR while applying high shear for 2 hours. Placed in oven at 350° F. overnight. After 24 hours, TR had settled to bottom of container. No tests run.
4. AC-5+10 Weight Percent TR+2 Weight Percent Oil, Based on Asphalt Weight. Same as above procedure but high sheared at 490° F. instead of 400° F. Checked for settlement. After 24 hours, three-quarters of TR settled out. No tests run.
5. AC-5+3.3 Weight Percent CLA+10 Weight Percent TR+2 Weight Percent Oil, Based on Asphalt Weight. Asphalt is heated and 2 weight percent aromatic oil (raffex 170) is added). The asphalt and oil mixture is heated to 400° F. 30 mesh crumb rubber from Baker Rubber is then added and high sheared using a Silverson Mixer for 2 hours. The rubber asphalt mixture is inspected for smoothness and, if needed, sheared longer. Once smooth, the temperature of the mixture is lowered to 375° F. and 3.3 weight percent CLA added using stirring for 15 minutes or so. The mixture is then tested for the desired properties, including settlement of rubber.
6. AC-10, meeting AASHTO M226-80 Table I.
7. AC-10+2 Weight Percent CLA, Based on Asphalt Weight.
8. AC-10+3.3 Weight Percent CLA, Based on Asphalt Weight. See procedure outlined in 2 above.
9. AC-10+3.3 Weight Percent CLA+10 Weight Percent Crumb Tire Rubber+2 Weight Percent Oil, Based on Asphalt Weight. Same as procedure in 3 above.
10. AC-10+3.3 Weight Percent CLA+15 Weight Percent Tire Rubber+2 Weight Percent Oil, Based on Asphalt Weight. Same as 6 above but with 15 weight percent tire rubber.
11. AC-20 meeting/LASHTO M226-80 Table II.
12. AC20+5 Weight Percent CLA, Based on Asphalt Weight. See procedure outlined in 2 above.
13. 15 Pen Asphalt. Hard asphalt with 10–15 Pen at 77° F.
14. 15 Pen Asphalt+4 Weight Percent CLA, Based on Asphalt Weight. See procedure outlined in 2 above.
15. 15 Pen Asphalt+5 Weight Percent CLA, Based on Asphalt Weight. See procedure outlined in 2 above.

Each of these products was subjected to a series of tests to determine properties related to asphalt product performance. These tests are:

1. Viscosity (ASTM D-4957) at 60° C. This test is used as an indicator of relative stiffness or hardness of an asphalt cement at a moderately high temperature to which a pavement might be expected to be subjected. Viscosity at such temperature also frequently is used as a specification by purchasers.
2. Viscosity (ASTM D-4957) at 135° C. This test is used as an indicator of relative stiffness or hardness of an asphalt cement at the highest temperature to which pavement might be expected to be subjected.
3. Penetration (ASTM D-5) at 4° C. This test is an indicator of relative stiffness or hardness of an asphalt cement at low temperature. This, with a stiffness value at a higher temperature, such as penetration at 25° C., provides an indicator of a temperature susceptibility of asphalt cements.
4. Penetration (ASTM D-5) at 25° C. This test is an indicator of relative stiffness or hardness of an asphalt cement at moderate temperature. Penetration at 25° C. is also specified in ASTM specifications for asphalt cements by many purchasers.
5. Ductility (ASTM D-113) at 4° C. This test method provides one measure of tensile properties of bituminous materials at low temperatures. It also is used to measure ductility for some polymer-modified asphalt cement specification requirements.
6. Softening point (AASHTO T-53) in degrees. Asphalt does not change from the solid state to the liquid state at any definite temperature, but gradually becomes softer and less viscous as the temperature rises. For this reason, the determination of softening point must be made by fixed, arbitrary and closely defined method if the results obtained are to be comparable. Softening point is indicative of the tendency of the asphalt to flow at elevated temperatures encountered in service. Softening point also is used in many purchasers' specifications for asphalt blends.
7. Float (ASTM D-139) in seconds. This is a measurement of the ability of the asphalt to resist flow at 60° C. A higher number indicates that the non-Newtonian properties have been achieved.
8. Penetration-Viscosity number (PVN). PVN was developed by McLeod as an indication of temperature susceptibility of asphalt. The PVN has become part of some asphalt specifications. By setting a minimum value for PVN, an attempt is made to control the temperature susceptibility of asphalt, especially excessive hardening of asphalt in the low temperature range.
9. The viscosity aging index is a ratio of the RTFO 60° C. viscosity to the original 60° C. viscosity indicating the rate at which asphalt hardens. A lower number indicates that the asphalt will age slower and resist cracking for a longer period of time.

Table 1 presents the results of each of these tests on each of the asphalt compositions 1 through 15:

TABLE 1

| | | TEST RESULTS ON ORIGINAL ASPHALT BLENDS | | | | | | | |
|---|---|---|---|---|---|---|---|---|---|
| Asphalt No. | Description | VIS @ 60° CPS | VIS @ 135° C. CST | PEN @ 4° C. DMM | PEN @ 25° C. DMM | DUCT @ 4° C. CM | SOFTENING POINT, °F. | FLOAT, SEC. | PVN |
| 1 | AC-5 | 608 | 189 | 65 | 172 | 100+ | 109 | 120 | −.79 |
| 2 | AC-5 + 3.3% CLA | 2,826 | 864 | 42 | 116 | 24 | 120 | 1,800+ | 1.18 |
| 3 | AC-5 + 10% TR + 2% Oil | Separated - no test data | | | | | | | |
| 4 | AC-10 + 10% TR + 2% Oil | Separated - no test data | | | | | | | |
| 5 | AC-5 + 3.3% CLA + 10% TR + 2% Oil | 2,000 | 509 | 62 | 123 | 33 | 115 | 1,800+ | .42 |
| 6 | AC-10 | 1,081 | 256 | | 115 | | 112 | 420 | −.76 |
| 7 | AC-10 + 2% CLA | 1,794 | 1,200 | | 81 | 10+ | | 1,800+ | 1.16 |
| 8 | AC-10 + 3.3% CIA | 3,210 | 1,310 | 22 | 75 | | 122 | 1,800+ | 1.18 |
| 9 | AC-10 + 3.3% CLA + 10% TR + 2% Oil | 2,489 | 606 | 31 | 67 | 10 | 120 | 1,800+ | −.07 |
| 10 | AC-10 + 33% CLA + 15% TR + 2% Oil | 18,963 | *7,100 | 37 | 62 | 13 | 172 | 1,800+ | 3.32 |
| 11 | AC-20 | 2,032 | 362 | 34 | 73 | 24 | 118 | 160 | −.72 |
| 12 | AC-20 + 5% CLA | | | | 35 | | | 165 | 1,800+ |
| 13 | 15 PEN AC | 15,000 | | | 11 | | 140 | | |
| 14 | 15 PEN AC + 4% CLA | | | | 14 | **45 | 195 | | |
| 15 | 15 PEN AC + 5% CLA | | | | 17 | **21 | 235 | | |

*Brookfield
**Ductility at 25° C.

Table 2 presents measurements for viscosity at 60° C. and 135° C., penetration at 4° C. and 25° C., ductility at 4° C. and a viscosity aging index of the asphalt after the Rolling Thin Film Oven Test ("RTFOT") prepared from the same asphalts as in Table 1. RTFOT residues are prepared from unaged asphalts that are artificially aged by applying heat and air to a small amount of asphalt placed in a bottle that is rotating in the rolling thin film oven. This test simulates the aging that occurs due to the processing in the hot mix plant, simulating the viscosity the asphalt will be at the time of placement on the roadway.

TABLE 2

| | MEASUREMENTS ON RTFOT RESIDUES | | | | | |
|---|---|---|---|---|---|---|
| Asphalt No. Description | VIS @ 60° C. PS | VIS @ 135° C. CST | PEN @ 4° C. DMM | PEN @ 25° C. DMM | VIS AGING INDEX | DUCT @ 4° C. CM |
| 1 AC-5 | 1.352 | 273 | 39 | 104 | 2.22 | 40 |

TABLE 2-continued

| | | MEASUREMENTS ON RTFOT RESIDUES | | | | | |
|---|---|---|---|---|---|---|---|
| Asphalt No. | Description | VIS @ 60° C. PS | VIS @ 135° C. CST | PEN @ 4° C. DMM | PEN @ 25° C. DMM | VIS AGING INDEX | DUCT @ 4° C. CM |
| 2 | AC-5 + 33% CLA | 5,23 | 1,066 | 20 | 78 | 1.93 | 10 |
| 3 | AC-5 + 10% TR + 2% Oil | Separated - no test data | | | | | |
| 4 | AC-10 + 10% TR + 2% Oil | Separated - no test data | | | | | |
| 5 | AC-5 + 33% CLA + 10% TR + 2% Oil | 5,260 | 646 | 45 | 90 | 2.63 | 16 |
| 6 | AC-10 | 2,417 | | | | 2.23 | |
| 7 | AC-10 + 2% CLA | 2,744 | | | | 1.54 | |
| 8 | AC-10 + 3.3% CLA | 5,280 | 1,120 | 16 | | | |
| 9 | AC-10 + 3.3% CLA + 10% TR + 2% Oil | 5,340 | 760 | 23 | 50 | 2.15 | 3 |
| 10 | AC-10 + 3.3% CLA + 15% TR + 2% Oil | 10,482 | | 31 | 61 | 1.03 | 14 |
| 11 | AC-20 | 4,869 | 468 | 24 | 54 | 2.35 | 9 |

Asphalt modified with CLA exhibits improved properties in the following areas:
1. reduced aging (aging ratio)
2. reduced temperature susceptibility (PVN)
3. improved high temperature performance (VIS 275, Float, Softening Point)
4. improved cold temperature performance (Pen at 4° C., 25 ° C.)

The data in Table 1 and Table 2 demonstrate, for example, that AC 5 modified with CLA is comparable in performance to the more expensive AC 20 or AC 30, based on the Vis at 60° C. Comparing AC 5 plus CLA to AC 20 note the aging ratio, PVN, kinematic viscosity, float, Pen at 4 ° C. and Pen at 25. the aging ratio is lower, indicating improved aging. The PVN is more positive, indicating reduced temperature susceptibility. The kinematic viscosity is higher indicating better high temperature properties. The float test indicates the asphalts' ability to resist flow at high temperatures. The penetrations are higher compared to asphalts with similar 60° C. viscosities indicating improved low temperature performance. The performance improvements is further substantiated by the Rheometric data contained in Table 3.

Asphalts further modified with tire rubber exhibit improvements to the penetration at 4° C., indicating improved cold-temperature performance. As the tire rubber concentration is increased, 10% to 15% (No. 6 vs. No. 7), viscosities increase drastically and the PVN improves drastically. Further, the aged ratio drops nearly to 1.0, showing the improvement to aging. Tests were not able to be run on control samples with tire rubber and no CLA, since the rubber does not stay in solution. All tire rubber plus asphalt plus CLA passed 30 day stability tests showing that the rubber is stable in the asphalt.

SHRP Binder Testing

SHRP, the Strategic Highway Research Program, was created by the federal government to investigate new methods to specify asphalt that would relate directly to pavement performance. Past methods tried to use penetration or viscosity to control the stiffness of the asphalt at various temperatures. These methods (called Pen grading or viscosity grading) were empirical and did not relate directly to pavement performance. SHRP is recommending that asphalts be graded by considering the climatic conditions and the loading conditions that the pavement will be subjected to SHRP created the following rheometric tests which evaluate the asphalt at various temperatures, aging conditions and loading conditions. User agencies are just beginning to specify SHRP graded asphalts. Very few suppliers can supply the grades at the extreme hot or cold ends of the grading scale.

The SHRP test performed on the asphalt compositions of the present invention are:

1. Dynamic Shear Rheometer (SHRP D-003). This test (abbreviated "DSR") utilizes a rheometer to measure the dynamic shear modulus or, or stiffness, of an asphalt cement. The stiffness properties of asphalt binders at the upper range of service temperatures determine, in part, the rutting resistance the asphalt binder contributes to the hot mix asphalt (asphalt and aggregate). At intermediate temperatures, the stiffness properties are related to fatigue resistance of hot mix asphalt. In Table 3, the DSR measurements for test samples are reported for "original DSR" referring to the unaged asphalt compositions, as "RTOT DSR," referring to RTFOT samples of the asphalt compositions and as "PAV RESID DSR" referring to pressure aging vessel samples of the compositions prepared the following method: The PAV (pressure aging vessel) residue is prepared by first subjecting the unaged asphalt to the aging of the RTFO. The RTFO residue is then placed on round trays and these trays are placed in the PAV vessel. The vessel is then pressurized to 2,100 kilopascals for 20 hours at a temperature of either 90° C., 100 ° C. or 110° C. depending on the climatic region. This residue represents the aging that the asphalt would receive after 8-10 years in the field.

2. Bending beam rheometer (SHRP B-002). This test, abbreviated "BBR" in Table 3, utilizes a bending beam rheometer to measure the low temperature stiffness of asphalt cements. The low temperature stiffness should be less than a maximum value to minimize magnitude of the thermal shrinkage stresses developed during pavement cooling. Table 3 presents pressure aging vessel residual BBR measurements for each of the asphalt compositions investigated as both "S" units (MPA) at the indicated temperatures and as "M" units (MPA) at the indicated temperatures.

3. SHRP grade. This measurement appearing as the last column in Table 3 indicates the preferred high and low temperature units of the resulting asphalt, in degrees Celsius. For example, the SHRP grade PG 52-28 for AC-5 indicates a product recommended for use in temperatures up to 52° C. and as low as −28° C.

TABLE 3

SHRP BINDING TESTING

| Asphalt Description | ORIGINAL DST G*/SINS, KPA @ °C. | RTFOT DSR G*/SINS, KPA @ °C. | PAV RESID. DSR G*/SINS, MPA @ °C. | PAV RESID. BBR S, MPA @ °C. | PAV RESID. BBR M, MPA @ °C. | SHRP GRADE |
|---|---|---|---|---|---|---|
| AC-5 | 1.40 @ 52° C. | 3.13 @ 52° C. | 2.82 @ 16° C. | 165 @ −18° C. | 0.40 @ −18° C. | PG 52-28 |
| AC-5 + CLA | 1.57 @ 64° C. | 2.61 @ 64° C. | 4.78 @ 18° C. | 197 @ −18° C. | 0.38 @ −18° C. | PG 64-28 |
| AC-5 + CLA + 10% TR | 1.03 @ 64° C. | 2.23 @ 64° C. | 3.69 @ 10° C. | 217 @ −24° C. | 0.35 @ −24° C. | PG 64-34 |
| AC-10 + CLA + 10% TR | 1.73 @ 64° C. | 3.05 @ 64° C. | 4.8S @ 16° C. | 188 @ −18° C. | 0.31 @ −18° C. | PG 64-28 |
| AC-10 + CLA + 15% TR | 2.54 @ 64° C. | 3.36 @ 64° C. | 3.32 @ 16° C. | 110 @ −18° C. | 0.35 @ −18° C. | PG 64-28 |
| AC-20 | 1.10 @ 64° C. | 2.36 @ 64° C. | 3.62 @ 22° C. | 173 @ −12° C. | 0.37 @ −12° C. | PG 64-22 |

Most prior art asphalt cements required the addition of substantial amounts of organic polymers such as styrene butidiene, styrene butidiene styrene, ethylene vinyl acetate and others in order to produce the performance characteristics required for high SHRP ratings. However, reference to Table 3 shows that, for example, the addition of the cross-linking agent of the present invention to a standard AC-5 asphalt increases the high temperature SHRP rating by two SHRP grades, from 52° C. to 58° C. to 64° C. Subsequent incorporation of 10 weight percent tire rubber reduced the low temperature rating by a similar amount, one grade, from −28° C. to −34° C. This produces a product equal or better in quality and SHRP rating to, for example, an AC-20 asphalt which is produced utilizing a high polymer content and would be much more expensive to produce than the AC-5 plus CLA or AC-5 plus CLA plus tire rubber content asphalts of the present invention. Comparing the results of Tables 1 and 2 to the SHRP results of Table 3, one can see the effects of the CLA and TR more clearly. The AC-5 viscosities have increased mirroring the SHRP grade increases from PG-52 to PG-64. The low temperature properties of the AC-5 are maintained and confirmed by the BBR results (see S and M).

4. Roofing Asphalt. Table 1, Nos. 12-15 show the effect of CLA at high percentages in two asphalts, AC-20 and hard 15 Pen asphalt. ASTM D-312 classifies roofing asphalts by the softening point, penetration and ductility. The softening point is used so that the asphalt will resist flow on inclines during high temperatures. The penetration and ductility are specified so that some resistance to cracking after aging will be available. To meet ASTM D-312, the current manufacturing method is to take light flux oils and air blow the light flux oils oxidizing the flux, drMng off the light fractions and hardening the flux meeting the desired D-312 grade. Air blowing is time consuming, expensive and is becoming an air quality restrictive operation. Permitting an air blowing still in and near large cities is becoming very hard due to the tightening of air quality laws. Table 1, No. 12 shows an AC-20 asphalt modified with 5% CLA that meets ASTM D-312 Type I roofing specifications. Table 1, No. 15 shows a 15 Pen asphalt modified with 5% CLA meeting ASTM D-312 Type IV roofing specifications. Of note is the very good ductility. Normal roofing asphalts barely pass a 5 ductility.

The foregoing disclosure and description is illustrative only, and various changes may be made in procedures, materials and compositions, within the scope of the appended claims, without departing from the spirit of the invention.

We claim:

1. An improved cross-linking agent for asphalt compositions, said cross-linking agent comprising:
   tall oil;
   a strong base;
   n-methyl fatty acid taurate; and
   fatty amines;
   said cross-linking agent being substantially free of water.

2. The cross-linking agent according to claim 1, wherein said tall oil comprises from about 50 to about 80 weight percent of said cross-linking agent.

3. The cross-linking agent according to claim 1 wherein said strong base comprises from about 10 to about 25 weight percent of said cross linking agent.

4. The cross-linking agent according to claim 1 wherein said n-methyl fatty acid taurate comprises from about 5 to about 25 weight percent of said cross linking agent.

5. The cross-linking agent according to claim 1 wherein said fatty amines comprise from about 1 to about 20 weight percent of said cross-linking agent.

6. An asphalt composition having improved adhesion to aggregate, said composition comprising:
   asphalt and an adhesion improving amount of a cross-linking agent;
   said cross-linking agent comprising the reaction product of tall oil, a strong base, n-methyl fatty acid taurate and fatty amines.

7. The asphalt composition according to claim 6 wherein said cross-linking agent is substantially free of water.

8. The asphalt composition according to claim 6 wherein said cross-linking agent comprises from about 1 to about 6 weight percent of said composition.

9. An asphalt composition having improved adhesion to crumb rubber from used automobile tires, said composition comprising asphalt and an adhesion improving amount of a cross-linking agent; said cross-linking agent comprising the reaction product of tall oil, a strong base, n-methyl fatty acid taurate and fatty amines and being substantially free of water.

10. The asphalt composition according to claim 9 wherein said cross-linking agent comprises from about 1 to about 6 weight percent of such composition.

11. An asphalt composition comprising:
    asphalt;
    crumb rubber from used automobile tires; and an adhesion improving amount of a cross-linking agent comprising tall oil, a strong anhydrous base, n-methyl fatty acid taurate and fatty amines, said cross-linking agent being substantially free of water.

12. A method for preparing an asphalt composition, said process comprising:

blending with an asphalt an adhesion improving amount of a cross-linking agent comprising the reaction product of tall oil, an anhydrous strong base, n-methyl fatty acid taurate and fatty amines to provide a first mixture; and blending with said first mixture crumb rubber from used automobile tires to provide a second mixture.

13. The method according to claim 12 wherein said first mixture includes from about 1 to about 6 weight percent of cross-linking agent, based upon the weight of said first mixture and wherein said second mixture comprises from about 5 to about 25 weight percent of crumb rubber, based upon the weight of said second mixture.

* * * * *